United States Patent

Kuruganti et al.

[11] Patent Number: 5,223,573
[45] Date of Patent: Jun. 29, 1993

[54] PC/ABS BLENDS EXHIBITING REDUCED GLOSS

[75] Inventors: Vijaya K. Kuruganti, Parkersburg; Keith E. Cox, Mineralwells; Kevin R. Kidder; Shripathy Vilasagar, both of Parkersburg, all of W. Va.; Ronald H. Place, Vincent, Ohio; John R. Schroeder, Mineralwells, W. Va.

[73] Assignee: General Electric Company, Pittsfield, Mass.

[21] Appl. No.: 843,119

[22] Filed: Feb. 28, 1992

[51] Int. Cl.$^5$ .............................. C08L 69/00
[52] U.S. Cl. ....................... 525/67; 525/69; 525/70; 525/72
[58] Field of Search ............ 525/67, 69, 70, 72

[56] References Cited

U.S. PATENT DOCUMENTS

| | | | |
|---|---|---|---|
| 3,264,272 | 8/1966 | Rees | 428/461 |
| 3,404,134 | 10/1968 | Rees | 525/329.6 |
| 4,657,970 | 4/1987 | Shiraki et al. | 525/70 |
| 4,677,162 | 6/1987 | Grigo et al. | 525/67 |
| 4,690,981 | 9/1987 | Statz | 525/329.6 |
| 4,710,534 | 12/1987 | Liu | 525/67 |
| 4,766,174 | 8/1988 | Statz | 525/71 |
| 4,810,649 | 1/1989 | Statz | 435/240.5 |
| 4,885,335 | 12/1989 | Gallucci et al. | 525/67 |
| 4,902,743 | 2/1990 | Boutni | 525/67 |
| 4,968,752 | 11/1990 | Kawamoto et al. | 525/194 |
| 4,972,020 | 11/1990 | Shiraki et al. | 525/67 |
| 5,026,777 | 6/1991 | Jalbert et al. | 525/67 |

FOREIGN PATENT DOCUMENTS 1213389 10/1986 Canada .
1260199 9/1989 Canada .

*Primary Examiner*—Paul R. Michl
*Assistant Examiner*—Olga Asinovsky
*Attorney, Agent, or Firm*—Andrew C. Hess

[57] ABSTRACT

Polymer blends are provided which exhibit reduced surface gloss while maintaining impact and flow properties. The blends comprise an aromatic polycarbonate resin, an acrylonitrile-butadiene-styrene graft copolymer and an ionomeric resin. The blends are useful as molding resins for making molded plastic parts exhibiting reduced surface gloss.

10 Claims, No Drawings

PC/ABS BLENDS EXHIBITING REDUCED GLOSS

BACKGROUND OF THE INVENTION

1. Field of the Invention

The present invention relates to polymeric blends exhibiting reduced gloss, and more particularly relates to blends comprising an aromatic polycarbonate, and ABS graft copolymer and an ionic polymer.

2. Description of the Related Art

Blends of polycarbonate resin and ABS resin are known, see for example, German Patent 1,170,141. Polycarbonate resin/ABS resin blends however exhibit high levels of gloss while in various applications it is desired that the blends exhibit low surface gloss. Thermoplastic molding compositions having a low gloss surface finish comprising a polymer blend of a polycarbonate and an emulsion graft ABS polymer, and a low gloss enhancing amount of a poly(epoxide) are known, see Jalbert et al, U.S. Pat. No. 5,026,777, which is incorporated herein by reference. While surface gloss reduction in PC/ABS blends can be achieved by the addition of polyepoxides, certain additives can, such as titanium dioxide and/or phosphite antioxidants, interfere with the gloss reducing abilities of the polyepoxides.

SUMMARY OF THE INVENTION

The present invention involves blends of aromatic polycarbonate resin with acrylonitrile-styrene-butadiene graft copolymers wherein a gloss reducing amount of an ionic polymer is included in the blend. The use of ionic polymer in the blend reduces the gloss of articles molded from the blends without substantially increasing the viscosity of the blends and can reduce the gloss even in the presence of certain additives which interfere with polyepoxide gloss reducing agents.

DETAILED DESCRIPTION OF THE INVENTION

The thermoplastic molding compositions of the invention comprise a polymer blend of a polycarbonate, an ABS graft copolymer and a gloss reducing amount of an ionic polymer.

The ABS component which is included in the present compositions comprises ABS type polymers, the molecules of which contain two or more polymeric parts of different composition, namely a rubber substrate and a graft part, that are bonded chemically. The ABS polymer is preferably prepared by polymerizing a conjugated diene, such as butadiene, or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. The ABS resins are preferably prepared by emulsion grafting methods well known in the art.

The specific conjugated diene monomers normally utilized in preparing the rubber substrate of the graft polymer are generically described by the following formula:

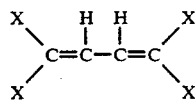

wherein X is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethylbutadiene, 2-ethyl-1,3-pentadiene 1,3- and 2,4-hexadienes, chloro and bromo substituted butadienes such as dichlorobutadiene, bromobutadiene, dibromobutadiene, mixtures thereof, and the like. A preferred conjugated diene is butadiene.

Optionally, the rubber substrate may be an acrylate rubber, such as one based on n-butyl acrylate, ethylacrylate, 2-ethylhexylacrylate, and the like. Additionally, minor amounts of a diene may be copolymerized in the acrylate rubber substrate to yield improved grafting with the matrix polymer. These resins are well known in the art and many are commercially available.

The substrate polymer, as mentioned, is preferably a conjugated diene polymer such as polybutadiene, polyisoprene, or a copolymer, such as butadiene-styrene, butadiene-acrylonitrile, or the like.

One monomer or group of monomers that may be polymerized in the presence of the prepolymerized substrate to form the graft portion of the ABS resin include monovinylaromatic compounds. The monovinylaromatic monomers utilized are generically described by the following formula:

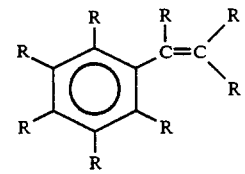

wherein R is selected from the group consisting of hydrogen, alkyl groups of 1 to 5 carbon atoms, cycloalkyl, aryl, alkaryl, aralkyl, alkoxy, aryloxy, and halogens. Examples of substituted vinylaromatic compounds include styrene, 4-methylstyrene, 3,5-diethylstyrene, 4-n-propylstyrene, α-methylstyrene, α-methyl vinyltoluene, α-chlorostyrene, α-bromostyrene, dichlorostyrene, dibromostyrene, tetrachlorostyrene, mixtures thereof and the like. The preferred monovinylaromatic monomers used are styrene and/or α-methylstyrene.

A second group of monomers that may be polymerized in the presence of the prepolymerized substrate to form the graft portion of the ABS resin include acrylic monomers such as acrylonitrile, substituted acrylonitrile, and/or acrylic acid esters, for example alkyl acrylates such as methyl methacrylate.

The acrylonitrile, substituted acrylonitrile, or acrylic acid esters are described generically by the following formula:

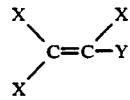

wherein X is as previously defined and Y is selected from the group consisting of cyano and carbalkoxy groups wherein the alkoxy group of the carbalkoxy contains from one to about twelve carbon atoms. Examples of such monomers include acrylonitrile, ethacrylonitrile, methacrylonitrile, α-chloroacrylonitrile, β-chloroacrylonitrile, α-bromoacrylonitrile, β-bromoacrylonitrile, methyl acrylate, methyl methacrylate, ethyl acrylate, butyl acrylate, propylacrylate, isopropyl acrylate and mixtures thereof. The preferred acrylic monomer is acrylonitrile and the preferred acrylic acid esters are ethyl acrylate and methyl methacrylate. It is also preferred that the acrylic acid esters, when included, are employed in combination with styrene or acrylonitrile.

In the preparation of the graft copolymer, the rubber substrate conjugated diolefin polymer or copolymer exemplified by a 1,3-butadiene polymer or copolymer preferably present at a level of from 15 to 90 percent by weight, and more preferably at from 30 to 70 percent by weight, and most preferably about 50 percent by weight, of the total ABS graft polymer. The monomers polymerized in the presence of the substrate to form the grafted portion, exemplified by styrene and acrylonitrile, preferably are together present at a combined level of from about 10 to about 85 percent by weight of the total ABS graft polymer, more preferably 30 to 70 weight percent thereof and most preferably about 50 weight percent thereof. It is additionally preferred that the second group of grafting monomers, exemplified by acrylonitrile, ethyl acrylate and methyl methacrylate, comprise from about 10 percent to about 40 percent by weight of the grafted portion of the ABS resin while the monovinylaromatic hydrocarbon monomers, exemplified by styrene, comprise from about 60 to about 90 percent by weight of the grafted portion of the ABS resin.

In preparing the polymer, it is normal to have a certain percentage of the polymerizing monomers combine with each other and occur as non-grafted rigid copolymer. If styrene is utilized as one grafting monomer and acrylonitrile is the second grafting monomer, a certain portion of the composition will copolymerize as free styrene-acrylonitrile copolymer. Similarly, in the case where α-methylstyrene (or another monomer) is substituted for the styrene in the composition used in preparing the graft polymer, a certain percentage of the composition may be an α-methylstyrene-acrylonitrile copolymer.

Also, there are occasions where a rigid polymer or copolymer, such as α-methylstyrene-acrylonitrile copolymer may be added to the graft ABS polymer by mechanical blending. The rigid polymers and copolymers which may be so added may be based on one or more of the following: monovinylaromatic compounds, methacrylic acid esters of $C_1$-$C_4$ aliphatic alcohols, acrylonitrile, substituted acrylonitrile and imidized maleic anhydride derivatives which are unsubstituted or substituted with an alkyl or aryl group. Examples of these rigid copolymers which may be added to the ABS graft polymer include polymethylmethacrylate (PMMA), copolymers of methyl methacrylate with one or more of the $C_1$-$C_4$ acrylates, styrene, α-methylstyrene and/or acrylonitrile, and the like. Such rigid copolymers may be prepared by emulsion, bulk, suspension, bulk-suspension or solution polymerization methods which are well known in the art.

In a preferred embodiment of the invention, the diene rubber backbone is present at a level of at least 50 weight percent based on the total weight of the ABS graft copolymer. The present composition preferably also contains an amount of styrene-acrylonitrile copolymer formed in a separate reaction.

The present compositions also contain a polycarbonate component. Polycarbonates are a special class of polyesters derived from the reaction of carbonic acid derivatives with aromatic, aliphatic, or mixed diols. They may be produced by the reaction of phosgene with a diol in the presence of an appropriate hydrogen chloride receptor or by a melt transesterification reaction between the diol and a carbonate ester. Polycarbonate can be made from a wide variety of starting materials, however, the principal polycarbonate produced commercially and preferred herein is bisphenol A polycarbonate, a polycarbonate made by reacting bisphenol A with phosgene by condensation. Also preferred are blends of bisphenol A polycarbonate with homopolymers and/or copolymers of brominated bisphenol A polycarbonate.

For a more complete discussion of the chemistry of polycarbonates, one may refer to Kirk-Othmer Encyclopedia of Chemical Technology, Third Edition(1982) Vol. 18, pp.479-494. This article, by D. W. Fox, is incorporated by reference in its entirety.

The present compositions also include an ionic hydrocarbon polymer component which preferably comprises an ethylene-methacrylic acid-zinc methacrylate terpolymer which is commercially available and sold by DuPont under the trademark Surlyn ®. Suitable ionic polymers are set out in U.S. Pat. No. 3,264,272, U.S. Pat. No. 43,404,134 and U.S. Pat. No. 4,968,752, all of which are incorporated herein by reference.

The ionic polymers comprise a polymer of an α-olefin having the general formula $R^1CH{=}CH_2$ where $R^1$ is a radical selected from the class consisting of hydrogen and alkyl radicals having from 1 to 8 carbon atoms, the olefin content of said polymer being at least 50 mol percent based on the polymer, and an α,β-ethylenically unsaturated carboxylic acid having 1 or 2 carboxylic acid groups, the acid monomer content of said polymer being from 0.2 to 25 mol percent based on the polymer, said carboxylic acid-containing polymer containing uniformly distributed throughout the polymer, one or more metal ions having ionized valences of 1 to 3 inclusive where the acid comonomer is monocarboxylic, and an ionized valence of one where the acid comonomer is dicarboxylic, the quantity of the metal ion being sufficient to neutralize at least 10 percent of the said carboxylic acid.

The α-olefin polymers employed in the formation of the ionic copolymers of the present invention are copolymers of α-olefins with ethylenically unsaturated acids. As indicated, the α-olefins employed in the copolymer are α-olefins which have the general formula $R^1CH{=}CH_2$ where $R^1$ is either a hydrogen or an alkyl group having preferably from 1 to 8 carbon atoms. Thus, suitable olefins include ethylene, propylene, butene-1, pentene-1, hexene-1, heptene-1,3-methylbutene-1,4-methylpentene-1, etc. Although polymers of olefins having higher carbon numbers can be employed in the present invention, they are not materials which are readily obtained or available. The concentration of the α-olefin is at least 50 mol percent in the copolymer, and is preferably greater than 80 mol percent.

The second essential component of the base copolymer comprises an α,β-ethylenically unsaturated carboxylic acid group containing monomer having preferably from 3 to 8 carbon atoms. Examples of such monomers are acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate and maleic anhydride. Although maleic anhydride is not a carboxylic acid in that it has no hydrogen attached to the carboxyl groups, it can be considered an acid for the purposes of the present invention because of its chemical reactivity being that of an acid. Similarly, other $\alpha,\beta$-monoethylenically unsaturated anhydrides of carboxylic acids can be employed. As indicated, the concentration of acidic monomer in the copolymer is from 0.2 mol percent to 25 mol percent, and preferably, from 1 to 10 mol percent.

The base copolymers employed in forming the ionic copolymers of the present invention may be prepared in several ways. Thus, the copolymers may be obtained by the copolymerization of a mixture of the olefin and the carboxylic acid monomer. This method is preferred for the copolymers of ethylene employed in the present invention. Methods employed for the preparation of ethylene carboxylic acid copolymers have been described in the literature. However, as pointed out further hereinafter, the preferred products are those obtained from base copolymers in which the carboxylic acid groups are randomly distributed over all of the copolymer molecules. In brief, that technique required carrying out the copolymerization of the $\alpha$-olefin and the carboxylic acid monomers in a single phase environment, i.e. one in which the monomers are soluble, e.g. benzene or ethylene, which may be in liquid or vaporized form. Preferably, and especially when relatively small amounts of the carboxylic acid component are desired in the base copolymer, the process is continuous, the monomers being fed to the reactor in the ratio of their relative polymer-forming reactivities and the residence time in the reactor being limited so that from about 3–20% of the ethylene-monomer feed is converted to polymer. In a preferred process, a mixture of the two monomers is introduced into a polymerization environment maintained at high pressures, 50 to 3000 atmospheres, and elevated temperatures, 150° to 300° C., together with a free radical polymerization initiator such as a peroxide.

Copolymers of $\alpha$-olefins with carboxylic acids may also be prepared by copolymerization of the olefin with an $\alpha$,-ethylenically unsaturated carboxylic acid derivative which subsequently or during copolymerization is reacted either completely or in part to form the free acid. Thus, hydrolysis, saponification or pyrolysis may be employed to form an acid copolymer from an ester copolymer. It is preferable to employ a copolymer containing the carboxylic acid groups randomly distributed over all molecules. Such random distribution is best obtained by direct copolymerization. Ionic graft copolymers which contain a third non-reactive monomer grafted to the carboxylic acid copolymer are, of course, satisfactory.

The copolymers employed to form ionic polymers are preferably of high molecular weight. The molecular weight of the copolymers useful as base resins is most suitably defined by melt index, a measure of viscosity, described in detail in ASTM-D-1238-57T. The melt index of copolymers employed in the formation of ionic copolymers which are useful as plastics is preferably in the range of 0.1 to 1000 g./10 min., and, more particularly, in the range of 1.0 to 100 g./10 min. The copolymer base need not necessarily comprise a two component polymer. Thus, although the olefin content of the copolymer should be at least 50 mol percent, more than one olefin can be employed to provide the hydrocarbon nature of the copolymer base. Additionally, other copolymerizable monoethylenically unsaturated monomers, illustrative members of which are mentioned below in this paragraph, can be employed in combination with the olefin and the carboxylic acid comonomer. The scope of base copolymers suitable for use in the present invention is illustrated by the following examples: Ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/furmaic acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, and ethylene/chlorotrifluoroethylene/methacrylic acid copolymers.

Metal ions which are suitable in forming the ionic polymers can be divided into two categories, uncomplexed metal ions and complexed metal ions. In the uncomplexed metal ions the valence of the ion corresponds to the valence of the metal. These metal ions are obtained from the commonly known and used metal salts. The complexed metal ions are those in which the metal is bonded to more than one type of salt group, at least one of which is ionized and at least one of which is not. Since the formation of the ionic copolymers requires only one ionized valence state, it will be apparent that such complexed metal ions are equally well suited in the present invention. The term "metal ion having one or more ionized valence states" means a metal ion having the general formula $Me^{+n}X^1{}_m$, where n is the ionic charge and is at least one, $X^1$ is a nonionized group and n+m equal the valence of the metal. The utility of complexed metal ions employed in the formation of ionic copolymers corresponds in their ionized valences to those of the uncomplexed metal ions. The monovalent metals are, of course, excluded but higher valent metals may be included depending on how many metal valences are complexed and how many can be ionized. The preferred complexed metal ions are those in which all but one metal valences are complexed and one is readily ionized. Such compounds are in particular the mixed salts of very weak acids, such as oleic and stearic acid, with ionizable acids, such as formic and acetic acid.

The uncomplexed metal ions which are suitable in forming the ionic polymers of the present invention, therefore comprise for the $\alpha$-olefin-monocarboxylic acid copolymers, mono-, di-and trivalent ions of metals in Groups I, II, III IV-A and VIII of the Periodic Table of Elements (see page 392, Handbook of Chemistry and Physics, Chemical Rubber Publishing Co., 37th ed.). Uncomplexed monovalent metal ions of the metals in the stated groups are also suitable in forming the ionic polymers with copolymers of olefins and ethylenically unsaturated dicarboxylic acids. Suitable monovalent metal ions are $Na^+$, $K^+$, $Li^+$ $Cs^+$, $Ag^+$, $Hg^+$, and $Cu^+$. Suitable divalent metal ions are $Be^{+2}$, $Mg^{+2}$ $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$ and $Zn^{+2}$. Suitble trivalent metal ions are $Al^{+3}$, $Sc^{+3}$, $Fe^{+3}$, and $Y^{+3}$.

The preferred metals, regardless of the nature of the base copolymer are the transition metals such as $Zn^{+2}$. These metals are preferred because they result in ionic copolymers having the best combination of improvement in solid state properties with retention of melt fabricability. It is not essential that only one metal ion be employed in the formation of the ionic copolymers and more than one metal ion may be preferred in certain applications.

The compositions of the present invention preferably comprise polycarbonate resin at a level of from 30 to 90 weight percent based on the total weight of the composition, more preferably from 60 to 80 weight percent thereof, and most preferably about 60 to 70 weight percent thereof. The compositions preferably comprise a non-grafted rigid copolymer, such as styrene-acrylonitrile copolymer, at a level of from 0 to 60 weight percent based on the total weight of the composition, more preferably from 5 to 30 weight percent thereof, and most preferably 15 to 25 weight percent thereof. The compositions preferably comprise a rubber containing graft copolymer, such as an ABS graft copolymer, at a level of from 3 to 30 weight percent based on the total weight of the graft copolymer, more preferably from 5 to 25 weight percent thereof, and most preferably from 10 to 20 weight percent thereof. The compositions may also contain additional ingredients such as hindered phenolic antioxidants, organic phosphite antioxidants, lubricants, mold release agents, flame retardants and colorants and/or pigments including titanium dioxide.

The ionic polymer is preferably present in a gloss reducing amount selected from between 1 and 20 weight percent based on the total weight of the composition, more preferably from 1 to 10 weight percent thereof, and most preferably from 3 to 8 weight percent thereof. The preferred ionic copolymer is a terpolymer of ethylene-methacrylic acid-zinc methacrylate.

EXAMPLES

The following examples illustrate the advantage of using ionomeric polymers as gloss reducing agents when compared to polyepoxide gloss reducing agents in polycarbonate/ABS blends when the blends further contain phosphites and titanium dioxide. Examples A-H are comparative examples. Examples 1 to 15 are examples comprising polycarbonate, graft polymer and ionomeric polymer.

The ionomers used in this study were obtained commercially from Du Pont, and are ethylene-methacrylic acid-zinc methacrylate terpolymers. The experimental blends containing PC, SAN, ABS and various ionomers (Surlyn ® ionomers). The ingredients were melt compounded in a twin screw extruder at a stock temperature of 500° F. and 300 RPM. Injection molding of the test samples (tensile bars, circular plaques) was done at 500° F. Table-I lists the formulations and properties of the experimental blends and control blends.

TABLE I

FORMULATIONS AND PROPERTIES OF PC/ABS BLENDS

| | SAMPLE ID# D022-46- | | | |
|---|---|---|---|---|
| | A | 1 | 2 | 3 |
| Polycarbonate | 64 | 64 | 64 | 64 |
| SAN 1 | 20 | 20 | 20 | 20 |
| HRG 1 | 16 | 16 | 16 | 16 |
| AO | 0.1 | 0.1 | 0.1 | 0.1 |
| SURLYN ® 9020 | — | 5.0 | — | — |
| SURLYN ® 9450 | — | — | 5.0 | — |
| SURLYN ® 9970 | — | — | — | 5.0 |
| GARDNER GLOSS, 60° | 88 | 31 | 15 | 16 |
| IZOD IMPACT, FT-LB/IN NOTCHED | 14 | 15 | 14 | 14 |
| MELT VISCOSITY, POISE MOBAY, 500° F., 1000/SEC | 3047 | 2937 | 3270 | 2589 |

*Surlyn ® is registered trademark of Du Pont for ionomer polymers.

Surlyn ® 9020: Ethylene-Methylmethacrylic acid-Zinc methacrylate terpolymer. Melt flow (ASTM D-1238) 1.1 g/10 min.

Surlyn ® 9450: Ethylene-Methacrylic acid-Zinc methacrylate terpolymer. Melt flow (ASTM D-1238) 5.5 g/10 min.

Surlyn ® 9970: Ethylene-Methacrylic acid-Zinc methacrylate terpolymer. Melt flow (ASTM D-1238) 14.0 g/10 min.

The polycarbonate is a bisphenol A polycarbonate.

SAN 1 is a 75:25 weight ratio styrene to acrylonitrile copolymer weight averages molecular weight 115000.

HRG 1 is an ABS graft copolymer having 50 weight percent polybutadiene rubber, and 50 weight percent styrene-acrylonitrile polymer as the graft part where the ratio of styrene to acrylonitrile is 72:28.

From TABLE-I it is evident that the blends containing Surlyn ® inomers (1through 3) have significantly lower gloss compared to control, and have comparable or better impact and flow properties.

*AO, is supplied by B. F. Goodrich as Goodrite 3114 and has the chemical structure 1,3,5-Tris(3,5-di-t-butyl-4-hydroxybenzyl)-s-trazine-2,4,6(1H, 3H,5H)trione, and is also known as 1,3,5-tris(3,5-di-t-butyl-4-hydroxybenzyl) 130 cyanurate.

TABLE II

| | SAMPLE 5080-15 | | | |
|---|---|---|---|---|
| | 4 | 5 | B | C |
| Polycarbonate | 64 | 64 | 64 | 64 |
| SAN 1 | 20 | 20 | 20 | 20 |
| HRG 1 | 16 | 16 | 16 | 16 |
| Surlyn 9450 | 3 | 3 | — | — |
| Diepoxide | — | — | 0.2 | 0.2 |
| TiO2 | — | 4 | — | 4 |
| Phosphite | — | 0.1 | 0 | 0.1 |
| AO | 0.1 | 0.1 | 0.1 | 0.1 |
| Lubricant | 0.5 | 0.5 | 0.5 | 0.5 |
| Gloss (60°) | 52 | 42 | 53 | 87 |
| Izod (73°F.) | | | | |
| (mean) | 14.4 | 12.4 | 13.3 | 12.6 |
| (stdev) | 1.3 | 0.4 | 0.7 | 0.4 |
| Izod (−20° F.) | | | | |
| (mean) | 9.5 | 5.1 | 9.1 | 9.2 |
| (stdev) | 1.2 | 1.0 | 0.4 | 3.5 |
| D-tup (73° F.) | | | | |
| (total) (mean) | 38.6 | 37.8 | 38.7 | 36.8 |
| (stdev) | 1.6 | 0.2 | 4.8 | 1.5 |
| D-tup (−20° F.) | | | | |
| (total) (mean) | 45.8 | 40.7 | 43.9 | 40.8 |
| (stdev) | 3.1 | 0.5 | 4.1 | 2.9 |
| Mobay, 550° F. Shear rate | | | | |
| 100 sec−1 | 4650 | 5280 | 4840 | 4400 |
| 500 sec−1 | 2470 | 2560 | 2470 | 2470 |
| 1000 sec−1 | 1470 | 1640 | 1520 | 1400 |

TABLE III

| | SAMPLE | | | | |
|---|---|---|---|---|---|
| | D | E | F | 6 | 7 |
| Polycarbonate | 100 | — | — | 64 | 64 |
| SAN 1 | 20 | 56 | 56 | 20 | 20 |
| HRG 1 | 16 | 44 | 44 | 16 | 16 |
| AO | 0.1 | — | — | — | — |
| SURLYN 9450 | — | — | 5.0 | 5.0 | — |
| Gloss (60°) | 93 | 68 | 67 | 55 | 92 |
| Izod (73° F.) | | | | | |
| (mean) | 17.3 | 5.3 | 7.3 | 21.6 | 20.3 |
| (stdev) | 1.9 | 0.1 | 0.1 | 2.9 | 1.9 |
| Kayness Vis. 500° F./sec. | | | | | |
| (97) | 10239 | 6386 | 6570 | 8767 | 9070 |
| (247) | 6529 | 4091 | 3807 | 5586 | 5917 |
| (493) | 4430 | 2738 | 2478 | 3937 | 4142 |
| (987) | 2900 | 1744 | 1599 | 2688 | 2797 |
| (1480) | 2221 | 1322 | 1237 | 2141 | 2174 |

TABLE IV

| | SAMPLE | | | | |
|---|---|---|---|---|---|
| | 8 | 9 | 10 | 11 | 12 |
| Polycarbonate | 64 | 64 | 64 | 64 | 64 |
| SAN 1 | 20 | 20 | 20 | 20 | 20 |
| HRG 1 | 16 | 16 | 16 | 16 | 16 |
| AO | 0.1 | 0.1 | 0.1 | 0.1 | 0.1 |
| SURLYN 9450 | 2.0 | 3.0 | 4.0 | 5.0 | — |
| SURLYN 9970 | — | — | — | — | 2.0 |
| Gloss | | | | | |
| 60° | 38 | 24 | 22 | 17 | 54 |
| 85° | — | — | — | 58 | — |
| Izod Impact (ft-lb/in) | 12.9 | 13.4 | 12.3 | 12.5 | 14.1* |
| Melt Viscosity 550° F., Kayness | | | | | |
| 100/sec | 5290 | 5230 | 5290 | 5830 | 5240 |
| 500/sec | 2790 | 2720 | 2850 | 3160 | 2790 |
| 1000/se | 1850 | 1790 | 1920 | 1990 | 1770 |

*Scattered Date 73° F.

TABLE V

| | SAMPLE | | | | |
|---|---|---|---|---|---|
| | 13 | 14 | 15 | G | H |
| Polycarbonate | 64 | 64 | 64 | 64 | 64 |
| SAN 1 | 20 | 20 | 20 | 20 | 20 |
| HRG 1 | 16 | 16 | 16 | 16 | 16 |
| AO | 0.1 | 0.1 | 0.1 | 0.1 | 0.1 |
| SURLYN 9970 | 3.0 | 4.0 | 5.0 | — | — |
| Diepoxide | — | — | — | 0.2 | — |
| Gloss | | | | | |
| 60° | 35 | 25 | 20 | 15 | 88 |
| 85° | — | — | — | 55 | — |
| 20° | — | — | — | — | 53 |
| Izod Impact (ft-lb/in) | | | | | |
| Melt Viscosity 550° F., Kayness | | | | | |

TABLE V-continued

| | SAMPLE | | | | |
|---|---|---|---|---|---|
| | 13 | 14 | 15 | G | H |
| 100/sec | 5330 | 5040 | 5000 | 6910 | 5410 |
| 500/sec | 2880 | 2860 | 2640 | 3800 | 2790 |
| 1000/sec | 1900 | 1890 | 1750 | 2460 | 1830 |

The phosphite used was Ultranox® 626 phosphite available from GE Specialty Chemicals Inc. The lubricant was Glycolube P.

What is claimed is:

1. A thermoplastic molding composition comprising:
   (a) an aromatic polycarbonate resin present at a level of from 30 to 90 weight percent based on the total weight of the composition;
   (b) an ABS graft copolymer present at a level of from 5 to 30 weight percent based on the total weight of the composition; and
   (c) a gloss reducing amount of an ionic polymer having an olefin content of at least 50 mol percent based on the polymer and an $\alpha,\beta$-ethylenically unsaturated carboxylic acid having 1 or 2 carboxylic acid groups.

2. The composition of claim 1, wherein said composition comprises said aromatic polycarbonate resin at a level of from 60 to 80 weight percent based on the total weight of the composition, and said ABS graft copolymer at a level of from 15 to 25 weight percent based on the total weight of the resin.

3. The composition of claim 2 wherein said aromatic polycarbonate resin is a bisphenol A polycarbonate resin.

4. The composition of claim 3 wherein said ABS graft copolymer comprise from 15 to 90 weight percent diene rubber based on the total weight of the ABS graft copolymer.

5. The composition of claim 1 wherein said ionic polymer is an ethylene-methacrylic acid-zinc methacrylate terpolymer.

6. The composition of claim 1 wherein said ionic polymer is formed from an $\alpha$-olefin, and $\alpha,\beta$-ethylenically unsaturated carboxylic acid, and a metal ion having an ionized valence selected from 1 to 3 inclusive.

7. The composition of claim 1 wherein said ionic polymer is present at a level of from 1 to 20 weight percent based on the total weight of the composition.

8. The composition of claim 6 wherein said ionic polymer is present at a level of from 1 to 20 weight percent based on the total weight of the composition.

9. The composition of claim 1 wherein said composition further comprises titanium dioxide and a phosphite.

10. The composition of claim 1 wherein said composition further comprises from 1 to 60 percent by weight styrene-acrylonitrile copolymer based on the total weight of the composition.

* * * * *